Figure 1:
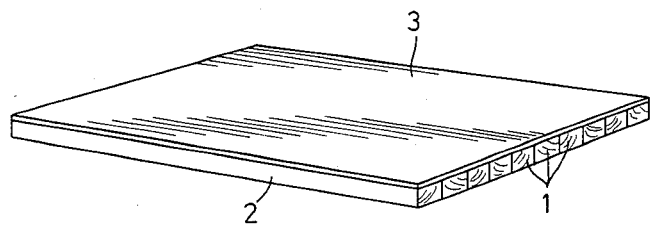

United States Patent [19]

Bouwhuis

[11] Patent Number: 4,496,304
[45] Date of Patent: Jan. 29, 1985

[54] MOULD FOR SHAPING SYNTHETIC MATERIAL AND MOULD FOR RENOVATING A CARRYING BOARD

[76] Inventor: Hendrik Bouwhuis, Nieuwe Haven 24, Hardenberg, Netherlands

[21] Appl. No.: 438,884
[22] PCT Filed: Feb. 4, 1982
[86] PCT No.: PCT/NL82/00003
 § 371 Date: Oct. 1, 1982
 § 102(e) Date: Oct. 1, 1982
[87] PCT Pub. No.: WO82/02698
 PCT Pub. Date: Aug. 19, 1982

[51] Int. Cl.³ ............................................. B29C 1/00
[52] U.S. Cl. .................................. 425/569; 425/570; 425/572; 425/588; 425/589; 425/595
[58] Field of Search ............... 425/116, 117, 129 R, 425/542, 572, 574, 588, 589, 101, 102, 257, 299, 128, 234, 233, 357, 405 R, 595, 570, 569; 249/134, 161, 119, 129; 164/303, 322, 323; 264/102

[56] References Cited

U.S. PATENT DOCUMENTS

| 2,463,560 | 3/1949 | Rempel .............................. 425/411 |
| 2,992,455 | 7/1961 | Salzman . |
| 3,026,575 | 3/1962 | Lusher et al. ...................... 264/261 |
| 3,307,220 | 3/1967 | Underwood ....................... 425/411 |
| 3,659,397 | 5/1972 | Rees . |
| 3,659,997 | 5/1972 | Rees .................................. 425/575 |
| 3,758,067 | 9/1973 | Kleiber .............................. 249/120 |
| 3,787,544 | 1/1974 | Barnette ............................ 264/255 |
| 3,954,377 | 5/1976 | Scholz et.al. ..................... 249/161 |
| 3,973,892 | 8/1976 | Rees .................................. 425/572 |
| 4,025,268 | 5/1977 | Taylor ............................... 425/589 |
| 4,265,850 | 5/1981 | Coulon et al. .................... 264/337 |

FOREIGN PATENT DOCUMENTS

| 1059447 | 3/1954 | France . |
| 1471971 | 3/1967 | France . |
| 2098224 | 3/1972 | France . |
| 2266587 | 4/1975 | France . |
| 7116038 | 5/1973 | Netherlands . |

Primary Examiner—Willard E. Hoag
Attorney, Agent, or Firm—Diller, Ramik & Wight

[57] ABSTRACT

Molding apparatus for encasing a wood pallet in plastic including a press with plural platens and plural carrier plates between the platens. The carrier plates carry plural mold frames between each pair of carrier plates. Each frame has an injection part. Movable means are included for connecting the mold injection parts with the resin supply. The frames are disposed at an angle to the horizontal for easy venting.

7 Claims, 15 Drawing Figures

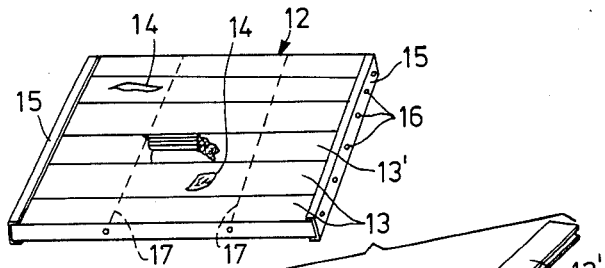
FIG.5
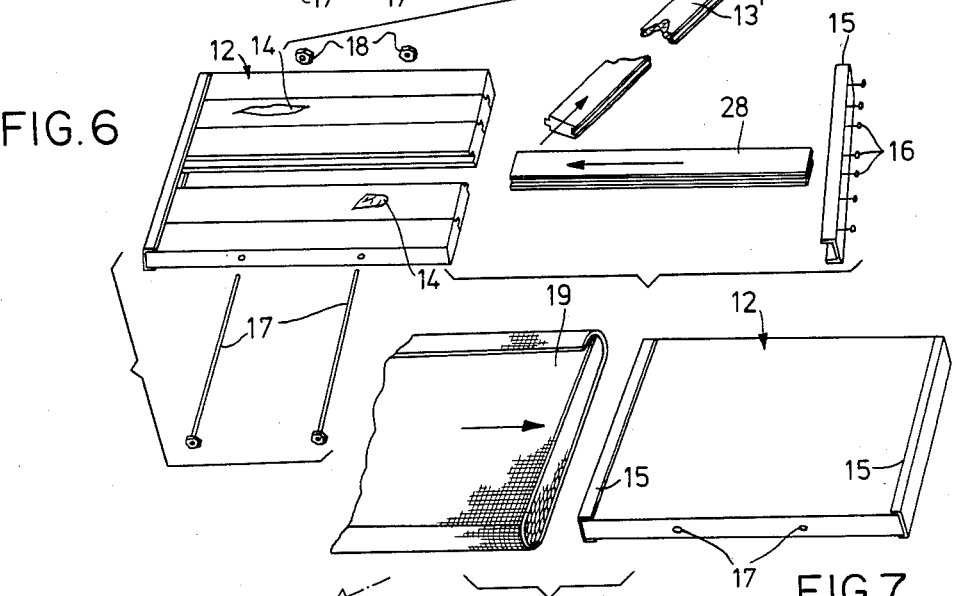
FIG.6
FIG.7
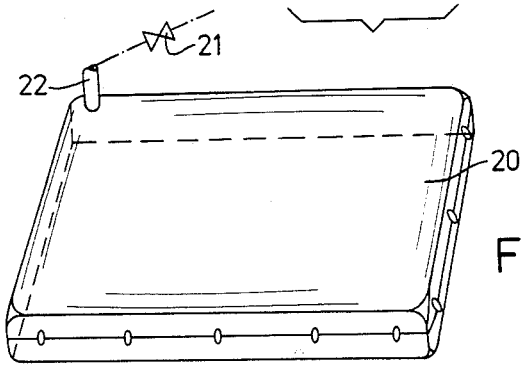
FIG.8

MOULD FOR SHAPING SYNTHETIC MATERIAL AND MOULD FOR RENOVATING A CARRYING BOARD

A carrying board formed, for example, by a wooden or plywood plate is known to be used in mass production on line of, for example, concrete products such as paving stones, curb stones, wall blocks and the like. In this process a templet is lowered onto the supported board and subsequently filled with mortar, after which the templet is removed, leaving behind the moulded product to cure. At the end of the production line the products lying at intervals on the board are shifted towards one another by clamping jaws and removed, whilst being clamped, from the board. Mechanical damage will thus soon arise, for example, indentations due to pressing down the templets and heavy wear due to shifting together the moulded products prior to removal. As a result of such mechanical damage the lifetime of such a known board is limited.

The invention relates to and provides in the first place a method of renovating a worn-out and/or damaged carrying board, in which method a mechanically strong coating is applied at least to the top face, as the case may be, after replacement of unusable parts. It should be noted here that for example, a known board already in use is provided with a coating in accordance with the teaching of this invention. This possibility of renovation brings about an additional advantage in that the user is not confronted with the problem of removing carrying boards having become unusable.

If, for example, a polyester resin is used for the coating, the user will be able to repair minor damage himself. For example, a paste may be used which contains glass fibre, which is applied together with a curing agent to the plate to be repaired, the plate being subsequently smoothed by means of a palette knife.

When a synthetic material is employed, the mould is determinative of the thickness and smoothness of the final carrying board. Thus these properties can be satisfactorily controlled, which is particularly important in an automated manufacturing process.

Shaping polyester resin in a mould has the disadvantage that polyester resin tends to stick to the walls of the mould cavity. Therefore, the mould cavity is greased with a detacking agent. This is a circuitous job and when it is carelessly carried out, the sticking problem does nevertheless occur.

The invention provides a method in which said problems are avoided in that liquid polyester resin is introduced into a mould, the cavity of which is bounded by polyethene.

The invention relates to and provides furthermore a mould having a cavity for shaping synthetic resin. This mould is characterized in that the mould cavity is bounded by polyethene. Particularly effective is high density polyethene.

Since this material does not readily adhere to other mould parts, a preferred embodiment of a mould according to the invention is characterized in that the edges of at least one polyethene plate are inserted into a groove of frame fillets and secured to the frame fillets by means of fastening means transversely directed to the groove.

A stationary seal between frame fillet and plate is obtained when at least one plate of polyethene, preferably high density polyethene is secured to a frame fillet and the frame fillet is in sealing relationship with the plate by means of a tag provided on the frame fillet.

The invention furthermore relates to and provides a device for applying a coating to carrying boards, said device being characterized by at least one carrier to which at least one mould can be fastened in a sloping position, the synthetic resin inlet being located on the lower side and a synthetic resin outlet on the top side of the mould cavity.

Figure 10:
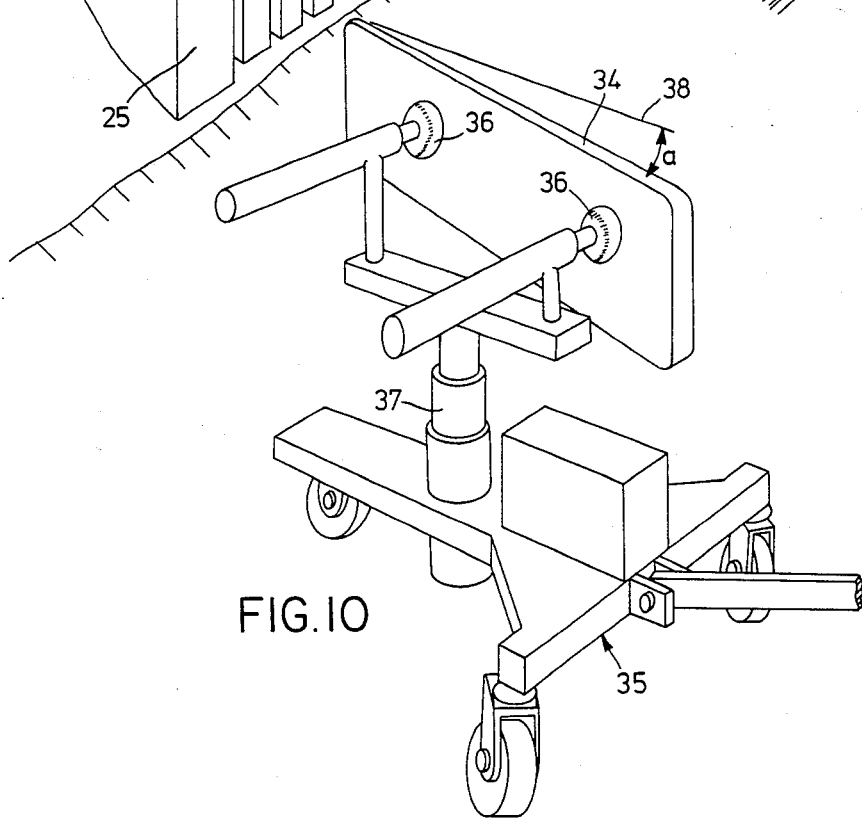
Figure 11:
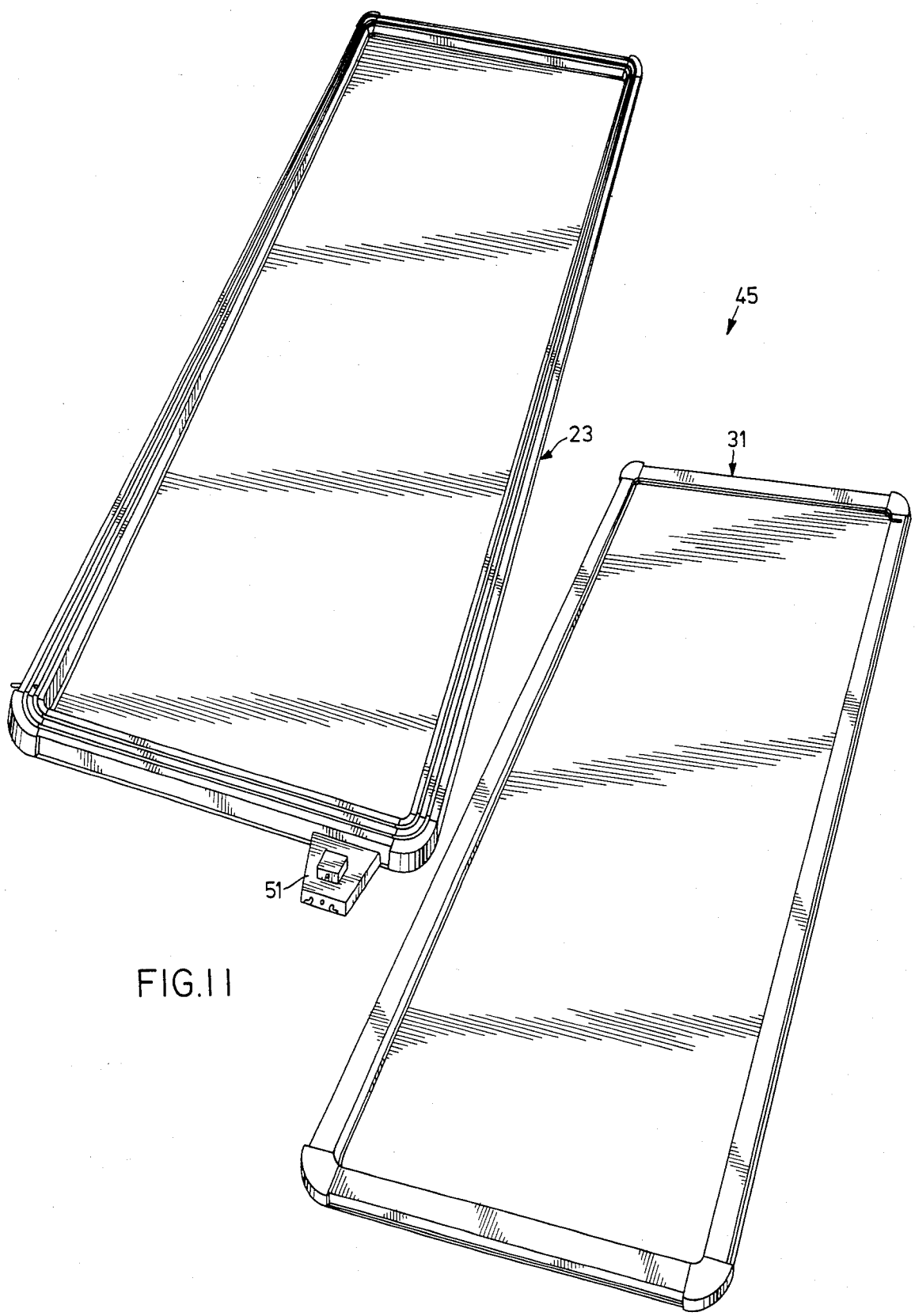
Figure 12:
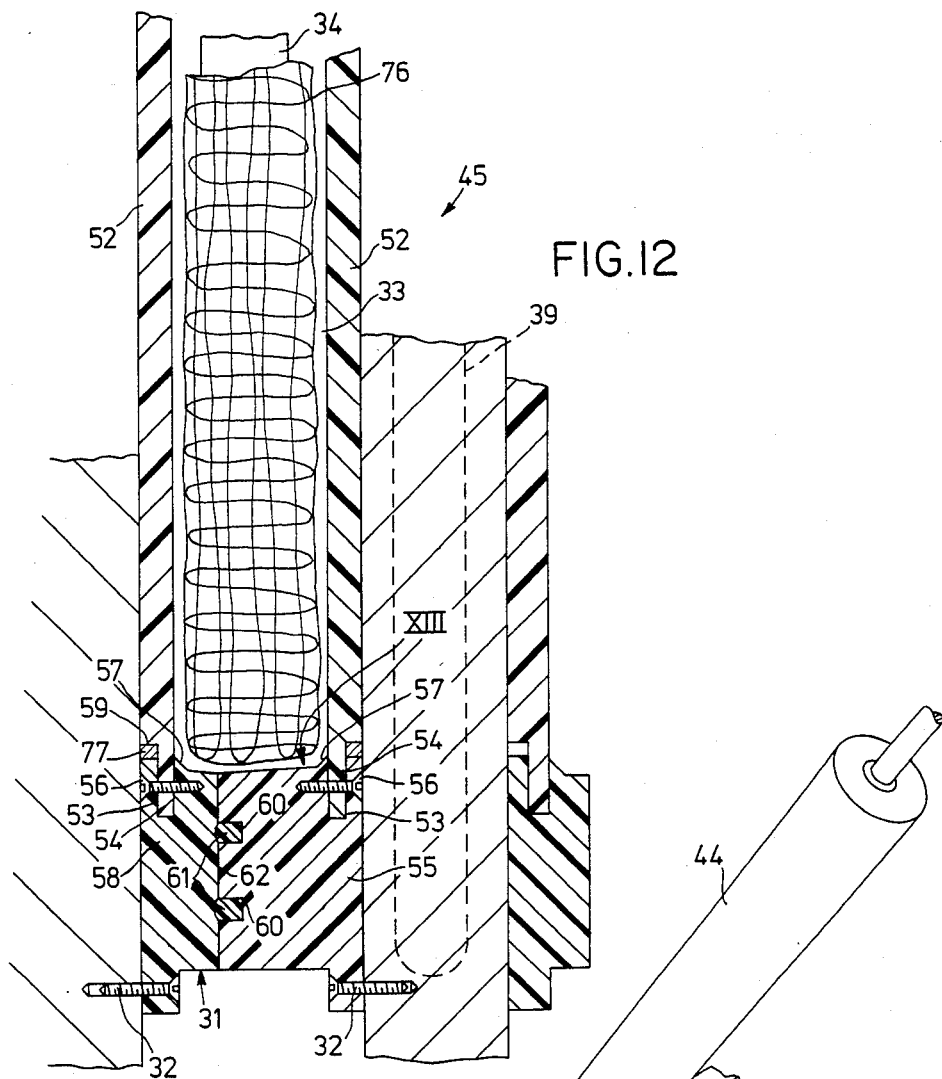
Figure 13:
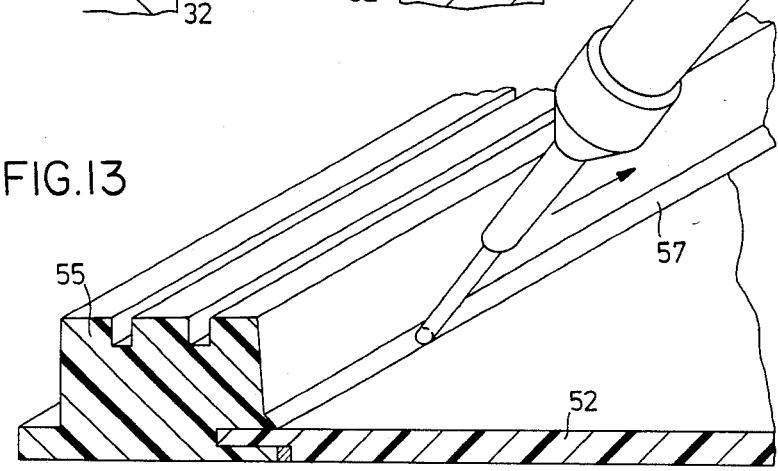
Figure 14:
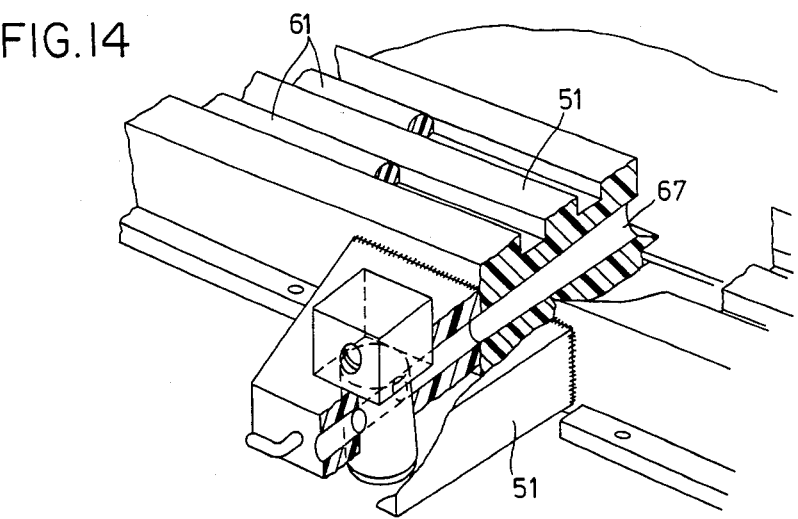

The above-mentioned and further features of the invention will be described with reference to a drawing of some examples and preferred embodiments. The drawing shows in FIG. 1 a perspective view of a first embodiment of a carrying board in accordance with the invention, FIG. 2 a perspective view, partly broken away, of a second embodiment of a carrying board in accordance with the invention, FIG. 3 a perspective view, partly broken away, of a third embodiment of a carrying board in accordance with the invention, FIG. 4 an enlarged cross-sectional view taken on the line IV—IV in FIG. 3, FIG. 5 a perspective view of a known, damaged carrying board, FIG. 6 a perspective view of the carrying board of FIG. 5 in a partly dismounted state, FIG. 7 a schematic, perspective view of the repaired carrying board of FIGS. 5 and 6 with a reinforcing mat to cover the same, FIG. 8 a schematic, perspective view of a mould for applying a coating, FIG. 9 a device for applying a coating to carrying boards in accordance with the invention, FIG. 10 a carriage to be used in the device of FIG. 9, FIG. 11 a perspective view of the two mould halves of a mould employed in the device of FIG. 9, FIG. 12 an enlarged sectional view of the mould of FIG. 11 taken on the line XII—XII in FIG. 9, FIG. 13 a detail XIII of FIG. 12 during the manufacture thereof, FIGS. 14 and 15 an enlarged, perspective view of details XIV and XV respectively of FIG. 9.

FIG. 1 shows a carrying board 2 composed of planks 1, to the top surface of which is applied a coating 3 in accordance with the invention.

Figure 2:
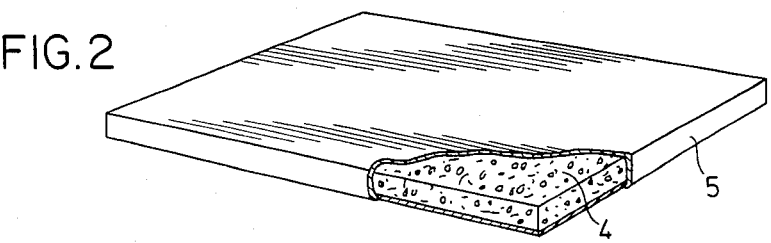

FIG. 2 shows a second embodiment. Herein the carrying board consists of a board 4 of compressed cuttings and is completely enveloped in a coating 5. It should be noted that by completely enveloping the board material cheaper material than the conventional deal or possible hardwood can be used for said board.

Figure 3:
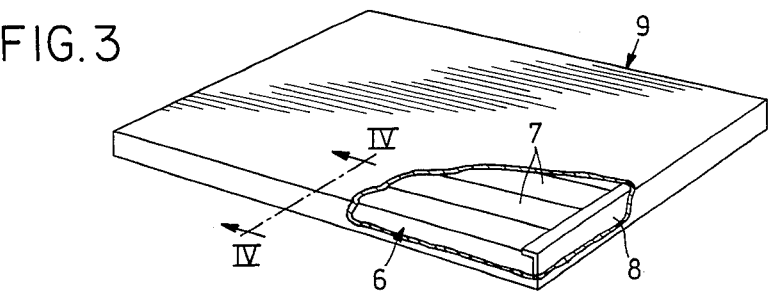
Figure 4:
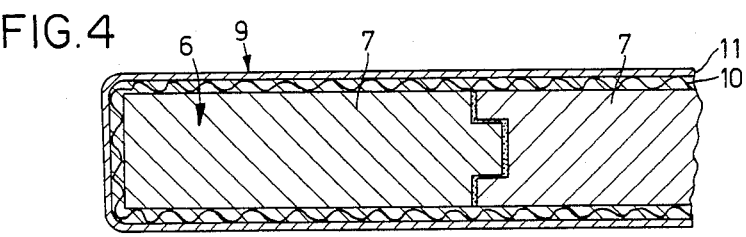

FIG. 3 shows a third embodiment of a carrying board in accordance with the invention. The carrying board 6 consists of a number of planks 7, which are coupled at the head ends by a U-shaped profile beam 8 so that the corresponding surfaces smoothly join one another. The U-shaped beam 8 is secured in place by elements (not shown), for example, wood screws. The carrying board is completely enveloped by a coating 9.

Figure 9:
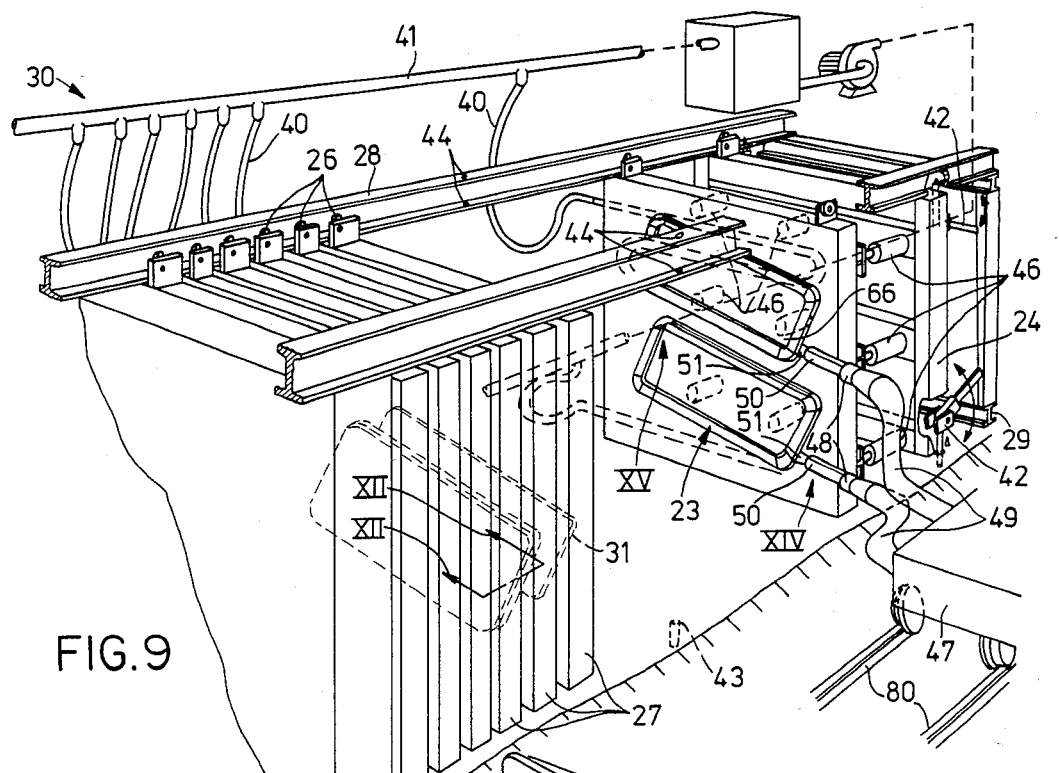

FIG. 9 is an enlarged cross-sectional view taken on the line IV—IV in FIG. 3. It is clearly apparent therefrom that the planks 7 are coupled with one another by corresponding, complementary profiles. In this embodiment a first coating 10 of reinforced polyester is applied around the assembled planks. Around this coating 10 is applied a second coating 11. The coatings 10 and 11 together constitute the covering coating 9.

FIG. 5 shows a known carrying board 12 in accordance with the prior art. This carrying board comprises planks 13, one of which, designated by reference numeral 13', has a hole. There are furthermore a plurality of less serious damaged areas 14. This damage is caused by scratches and/or indentations. The carrying board 12 is provided at the head edges with U-section beams 15, which are fastened to the planks 13 by means of screws 16. The connections of the planks 13 with one another are furthermore established by means of bolts 17 passed through holes previously provided in the planks 13 and co-operating with nuts 18. The nuts and bolt heads are countersunk in the side planks.

FIG. 6 illustrates how the plank 13' is removed after the removal of one of the U-section beams 15 and will be replaced by a new, at least further usable plank 28.

After complete assembly of the repaired board 12 a reinforcing mat 19 is arranged around the board 12 as is shown in FIG. 7. This reinforcing mat 19 may consist of non-cured polyester resin including glass fibres. Subsequently the carrying board 12 provided with the reinforcing mat 19 is placed in a mould 20 schematically shown in FIG. 8, after which by opening a flap 21 a polyester resin is introduced by pressure through an inlet 22. After the polyester resin has cured the carrying board is ready for use.

It should be noted that the method of renovation described with reference to FIGS. 5 to 8 may also be employed for manufacturing new carrying boards and that the invention is not limited to the embodiments described.

The device 30 for coating carrying boards 34, 2, 4, 6 or 12 with a polyester layer 5, 9 comprises a frame 29 having two horizontal rails 28, to which a series of hanging plates 27 with rollers 26 are suspended so as to be mobile between a stationary supporting plate 25 and a displaceable supporting plate 24. To the hanging plates 27 can be individually fastened mould halves 23 and 31 by means of screws 32.

The mould halves 23 and 31 together form a mould cavity 33 adapted to receive a carrying board 34. The carrying boards 34 to be coated or renovated are each supplied for example, by carriages 35 to which they are suspended, for example, by means of sucking cups 36 in a vertical plane inclined at an angle a to the horizon 38. By means of a lifting cylinder 37 they are suspended to a carriage 35 at the selected level corresponding with the level of the mould cavity 33 concerned.

The carrying boards are provided with heating means 39, for example, steam pipes connected by means of hoses 40 with a steam feeding conduit 41. The supporting plate 24 can be bolted by means of lock bolts 42 to floor cylinders 43 and rail holes 44 so that the hanging plates 27 with the moulds 45 arranged between them and filled with carrying boards 34 can be joined, for example, by hand to form a continuous assembly, after which by energizing short hydraulic rams 46 the required high closing pressure can be obtained.

The device 30 comprises a polyester injection device 47 known per se being displaceable along rails 80, which can be connected for supplying liquid polyester at high pressure, with each inlet 51 of two moulds 45 through heated ducts 49 and a connecting head 50 including a closing member 48.

The mould halves 23 and 31 comprise high frame fillets 55 and low frame fillets 58 respectively. Each mould halve 23, 31 comprises a plate 52 of hard polyethene, viz. high density polyethene, which is known by the indication PE50 and also known by the trade name hostaleen GM5010 or GM5010T$_2$. The edges 54 of the plate 52 are intimately fitted in a groove 53 of the frame fillets 55, 58 of the same material and are secured to the frame fillets 55 by means of fastening means formed by screws 56 directed transversely to the groove 53.

On the outer side of the mould 45, adjacent the groove 53, a sealing strip 77 of silicon rubber is arranged in a groove 59, in which it is fastened by a thermal weld. The fillets 55 of the mould half 23 have furthermore two grooves 60 holding sealing strips 61 of silicon rubber, which bulge out when the mould is not closed and join the closing face 62 of the mould half 31 in the closed state.

The frame fillets 55 are interconnected by means of elbow pieces 63 and connecting pins 64. Likewise the frame fillets 58 are interconnected by means of elbow pieces 65 and connecting pins 64.

Figure 15:
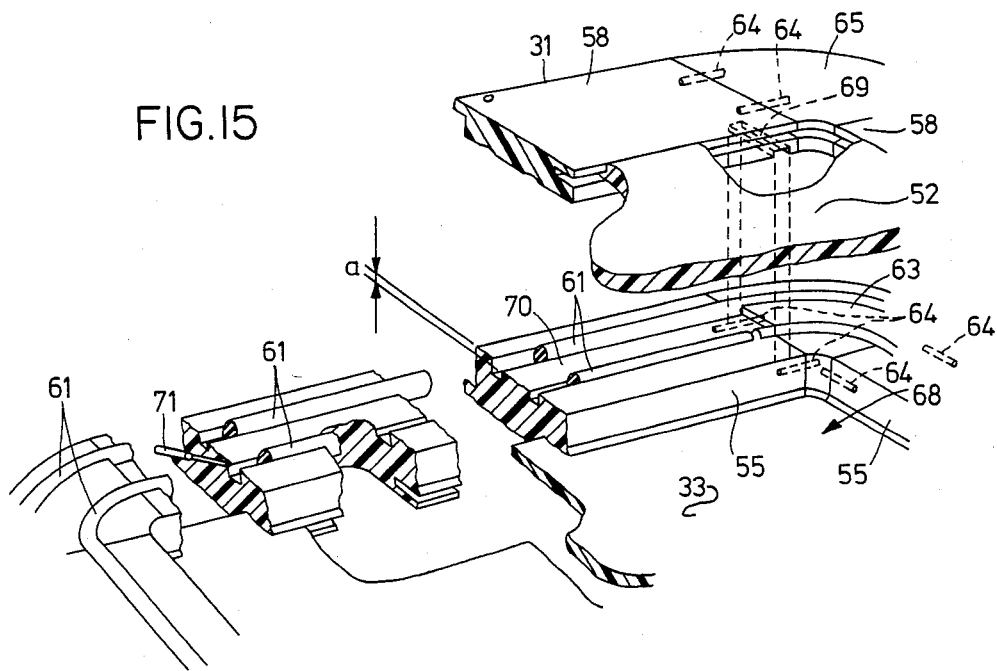

The inlet piece 51 provided at the lower corner 66 has a tapering spray-casting entrance 67. The connecting piece of the resultant product can thus be readily removed. Complete filling of the mould 45 is ensured by the sloping disposition of the mould 45, the synthetic resin feed on the lower side and venting on the top side 68 (FIG. 15). The fillet 58 has a transverse channel 69 connecting the mould cavity 33 with a channel 70 formed by a depression a of 0.5 mm between the sealing strips 61 and communicating with an outlet 71. As soon as liquid synthetic resin emerges from the outlet 71 the filling process is stopped by closing the closing member 48.

Owing to the narrow channel 70 and the resultant flow resistance the mould cavity 33 can be filled with high pressure.

In manufacturing and particularly in renovating carrying boards 34 they are first enveloped in one or more mats 76 of reinforcing fibres and placed in a mould half 23 in the deepest part of the opened mould cavity 33 and the moulds 45 are closed at high pressure and individually filled through the opened closing member 48 so that the liquid polyester envelops the carrying boards 34 on all sides and penetrates into all orifices and cracks thereof. Owing to the use of the selected material bounding the mould cavity 33 and owing to the smooth transitional area of the tag 57 each ready carrying board can be readily removed from the opened mould. Owing to the internal pressure of the mould cavity 33 the tag 57 engages the plate 52 in sealing relationship.

In the manufacture of the mould the tag 57 is moved, for example, by means of a direction pointer 75 and formed on the plate 52 by a hot-air welding tool 74.

It should be noted that polyethene and particularly hard polyethene, especially the mentioned high density polyethene is useful not only for carrying board moulds but also for coating mould cavities for other, particularly, bulky products such as surf boards and the like.

I claim:

1. A device for producing carrying boards to be used in the production of bricks, thereby giving the boards a predetermined thickness, comprising: a series of plural moulds, each of the plural moulds of each of said series of moulds being a peripheral mould frame sandwiched between an associated pair of spaced, opposed carrier plates of a battery of a plurality of movable carrier plates; said battery having common high pressure closing means for moving said carrier plates toward each other into said spaced relation so as to sandwich said moulds firmly therebetween, said moulds having inlets out of contact with said spaced carrier plates which are individually connectable to a common outlet of a common resin injection moulding device, said common outlet being movable to the individual inlets of said series of moulds, said plural mould frames being vertically spaced and positioned with open ends facing opposing movable carrier plates.

2. A device as claimed in claim 1 including at least one carrier plate and at least one mould located thereon in a sloping position, the synthetic resin inlet being located on the lower side and a synthetic resin outlet being located on the top side of the mould cavity.

3. A device as claimed in claim 1, wherein the closing means is carried by displaceable supporting means which is lockable in a fixed position.

4. A device as claimed in claim 3 including at least one carrier plate and at least one mould located thereon in a sloping position, the synthetic resin inlet being located on the lower side and a synthetic resin outlet being located on the top side of the mould cavity.

5. A device as claimed in any one of claims 1-4 wherein each mould cavity is bounded by a pair of polyethene sheets respectively secured in face-to-face relation to the surfaces of a corresponding pair of carrier plates.

6. A device as claimed in any one of claims 1-4 wherein each mould cavity is bounded by a pair of high density polyethene sheets respectively secured in face-to-face relation to the surfaces of a corresponding pair of carrier plates.

7. A device as claimed in any one of claims 1-4 wherein each mould is formed of two sections, each section including a mould plate of polyethene secured in face-to-face relation to an associated carrier plate, a circumscribing mould frame defining a groove receiving the edge of said mould plate, and fastening means directed transversely to the groove for securing the mould plate to the frame the mould plates closing said open ends of said frames.

* * * * *